United States Patent [19]

Prickril

[11] 3,857,805

[45] Dec. 31, 1974

[54] HYDROCARBON WAX COMPOSITION
[75] Inventor: William A. Prickril, Lakewood, N.J.
[73] Assignee: Cities Service Oil Company, Tulsa, Okla.
[22] Filed: Mar. 25, 1974
[21] Appl. No.: 454,208

Related U.S. Application Data
[63] Continuation-in-part of Ser. No. 301,580, Oct. 27, 1972, abandoned.

[52] U.S. Cl. .......................................... 260/28.5 B
[51] Int. Cl. .......................................... C08f 45/52
[58] Field of Search ................. 260/28.5 A, 28.5 B; 106/270

[56] References Cited
UNITED STATES PATENTS
2,808,382    10/1967    Jakaitis .......................... 260/28.5 A
3,312,648    4/1967    Guttman et al. ................ 260/28.5 A
3,639,323    2/1972    Morrisey ........................ 260/28.5 B Primary Examiner—Morris Liebman
Assistant Examiner—S. L. Fox
Attorney, Agent, or Firm—John W. Carpenter; Patricia J. Hogan

[57] ABSTRACT

Stratification and the exudation of oil from oil-containing hydrocarbon wax compositions are prevented by the incorporation therein of a minor proportion of an ethylene/propylene/non-conjugated polyene terpolymer having a combined ethylene content of about 30–85% by weight and an iodine number of about 5–15.

10 Claims, No Drawings

HYDROCARBON WAX COMPOSITION

CROSS-REFERENCE TO RELATED APPLICATION

This application is a continuation-in-part of copending application Ser. No. 301,580, now abandoned, filed Oct. 27, 1972.

BACKGROUND OF THE INVENTION

1. Field of the Invention

This invention relates to hydrocarbon wax compositions and more particularly relates to such compositions having a relatively high oil content.

2. Description of the Prior Art

It is known that hydrocarbon waxes are useful in applications such as candles, cosmetic preparations, carton coatings, crayons, waterproofers in construction boards, binders for charcoal briquettes, etc. However, it is also known that unrefined hydrocarbon waxes, which have relatively high oil contents, are somewhat unsatisfactory in such applications because of their tendency to exude oil or to stratify. Exuded oil imparts an undesirable feel and appearance to the wax article and stains anything with which it comes into contact; stratification, which is caused by an uneven distribution of oil in the wax, is unsightly and apt to be accompanied by excessive softness.

A known solution to these problems is to dilute the oilcontaining hydrocarbon wax with an amount of refined wax sufficient to reduce the oil content to an acceptable level, i.e., a level less than about 1–2%. However, this solution to the problem is uneconomical.

SUMMARY OF THE INVENTION

An object of this invention is to provide novel oilcontaining hydrocarbon wax compositions.

Another object is to provide such compositions which do not stratify or exude oil.

A further object is to provide such compositions economically.

These and other objects are attained by blending a major proportion of a hydrocarbon wax containing about 10–40% by weight of oil with a minor proportion of an ethylene/propylene/non-conjugated polyene terpolymer having a combined ethylene content of about 30–85% by weight and an iodine number of about 5–15.

DESCRIPTION OF THE PREFERRED EMBODIMENTS

The hydrocarbon wax of the invention is one that contains about 10–40%, usually about 15–35%, by weight of oil. It may be a paraffin wax, i.e., a wax which is predominantly a mixture of normal paraffins containing about 15–40 carbons; or it may be a microcrystalline wax, i.e., a wax which is predominantly a mixture of isoparaffins containing about 20–50 carbons.

Exemplary of such waxes are paraffinic and microcrystalline soft waxes, which contain about 10–30% by weight of oil; petrolatums, which are primarily branched chain hydrocarbons containing about 15–25% by weight of oil; slack wax, which is a paraffin wax containing about 5–10% by weight of oil; a soft wax derived from neutral oil and containing about 10–30% by weight of oil; scale wax, which is a paraffin wax containing about 1–5% by weight of oil; blends thereof with one another; and blends thereof with refined hydrocarbon waxes, which usually have oil contents not higher than about 1–2% by weight.

The ethylene/propylene/non-conjugated polyene terpolymer of the invention is a member of the well-known group of amorphous, elastomeric materials known as EPT or EPDM, which are made by the interpolymerization of ethylene, propylene, and a non-conjugated polyene, such as hexadiene-1,4; dicyclopentadiene; decatriene-1,4,9, cyclooctadiene-1,5; norbornadiene, etc. The terpolymers which are utilizable in the practice of the invention are those which have combined ethylene contents of about 30–85%, preferably about 40–75%, by weight; combined polyene contents such as to give iodine numbers of about 5–15, preferably about 8–10; and combined propylene contents constituting the remainder of the terpolymer. Ordinarily they have specific gravities of about 0.84–0.89, preferably about 0.85–0.87. They are used in amounts such as to constitute a minor proportion of the composition, the exact amount not being critical and usually varying with the amount of oil in the hydrocarbon wax. Most commonly, the compositions of the invention contain about 0.02–6% by weight of the terpolymer, the larger amounts being employed when the wax has a higher oil content.

The compositions of the invention may be made by blending the aforementioned ingredients in any suitable manner which provides a major proportion of the wax and a minor proportion of the terpolymer. For example, the terpolymer may be directly incorporated into the oil-containing wax, or it may be pre-blended with a refined wax and incorporated into the oil-containing wax as a pre-blend. The latter technique is preferable, both because it permits easier incorporation of the terpolymer and because chips of the pre-blend do not tend to block, or agglomerate, into a solid mass on standing at room temperature prior to being incorporated into the oil-containing wax. When this technique is used, the terpolymer is ordinarily blended with a refined paraffin or microcrystalline wax containing little or no oil to form a pre-blend having a terpolymer content of about 40–75%, e.g., about 65%; and the pre-blend is incorporated into the oil-containing wax so as to give a terpolymer content of about 0.02–6%, preferably about 0.5–4%, by weight in the final composition.

The invention is advantageous in that it economically prevents stratification and the exudation of oil from hydrocarbon waxes containing about 10–40% by weight of oil, thus permitting the use of such waxes in applications wherein stratification and exudation cannot be tolerated. It is also advantageous in that the terpolymer actually hardens the waxes, thus making them particularly useful in applications wherein excessive softness must be avoided.

The following examples are given to illustrate the invention and are not intended as a limitation thereof. Unless otherwise specified, quantities mentioned are quantities by weight.

EXAMPLE 1

Part A - Control

Melt a soft wax having an oil content of about 28–32%, pour it into a suspended cardboard container at a temperature of about 200°F., and allow it to cool. Examine the exposed top surface of the solidified wax composition for the presence of exuded oil droplets, and also examine the cardboard container for staining by separated oil. These examinations show both exuded surface oil and staining.

Part B

Repeat Part A except for first blending the soft wax with varying amounts of a pre-blend of 65 parts of an ethylene/propylene/non-conjugated diene terpolymer (ethylene content — 40–75%; iodine number — 8–10) and 35 parts of refined microcrystalline wax to form blends containing, respectively, 3.25%, 1.62%, 0.81%, and 0.4% of the terpolymer. In each case, there is no exuded surface oil or staining.

EXAMPLE II

Repeat Example I except for replacing the soft wax with a petrolatum having an oil content of about 18–20%. None of the solidified wax compositions exhibits exuded surface oil, and none of the compositions of the invention stains the cardboard. The control composition, on the other hand, is observed to stain the surrounding cardboard.

EXAMPLE III

Part A - Control

Blend 90 parts of a fully refined neutral hydrocarbon wax with 10 parts of a soft wax having an oil content of about 28–32%. Form the composition into a candle. Place the candle in a necked-down glass votive candle container and burn it continuously for four days. Then examine the container for soot deposits, which are indicative of poor burning qualities caused by separated oil. There are soot deposits.

Part B

Repeat Part A except for forming candles from, respectively, 40/59/1, 49/50/1, and 70/29/1 blends of the refined wax, the soft wax, and the terpolymer of Example I. There are no soot deposits.

EXAMPLE IV

Part A - Control

Repeat Example I, Part A, except for pressing the solidified wax composition with a finger to note the amount of oil pressed out, measuring the percent of the bottom area of the container that is soaked with oil, and also determining the firmness of the composition. The amount of oil pressed out constitutes a pool, 100% of the container bottom is soaked, and the composition is very soft.

Part B

Repeat Part A except for first blending the soft wax with varying amounts of the terpolymer of Example I to form blends containing, respectively, 5%, 2.5%, 1.25%, 0.63%, 0.32%, and 0.16% of the terpolymer. In each case, no oil is pressed out, none of the container bottom is soaked, and the composition is firm.

Part C

Repeat Part B except for using only 0.08%, 0.04%, and 0.02%, respectively, of the terpolymer. In each case, only a small amount of oil is pressed out. The degree of soaking varies from very slight at the 0.08% terpolymer level to 80% at the 0.02% terpolymer level, and the degree of firmness varies from slightly soft at the higher terpolymer levels to soft at the lowest terpolymer level.

It is obvious that many variations may be made in the products and processes set forth above without departing from the spirit and scope of this invention.

What is claimed is:

1. A composition comprising a major proportion of a hydrocarbon wax containing about 10–40% by weight of oil and a minor proportion of an ethylene/propylene/non-conjugated polyene terpolymer having a combined ethylene content of about 30–85% by weight and an iodine number of about 5–15.

2. The composition of claim 1 wherein the hydrocarbon wax is a paraffin wax.

3. The composition of claim 1 wherein the hydrocarbon wax is a microcrystalline wax.

4. The composition of claim 1 wherein the hydrocarbon wax is a blend of a refined hydrocarbon wax and an unrefined, oil-containing hydrocarbon wax.

5. The composition of claim 1 wherein the hydrocarbon wax contains about 15–35% by weight of oil.

6. The composition of claim 1 wherein the terpolymer has a specific gravity of about 0.84–0.89.

7. The composition of claim 6 wherein the terpolymer has a specific gravity of about 0.85–0.87.

8. The composition of claim 1 wherein the terpolymer constitutes about 0.02–6% of the weight of the composition.

9. The composition of claim 8 wherein the terpolymer constitutes about 0.5–4% of the weight of the composition.

10. The composition of claim 1 wherein the terpolymer has a combined ethylene content of about 40–75% by weight and an iodine number of about 8–10.

* * * * *